Jan. 16, 1968  J. T. VILLANUEVA  3,363,664
SCHEME OF SALT MANUFACTURE
Filed Nov. 4, 1964  3 Sheets-Sheet 3
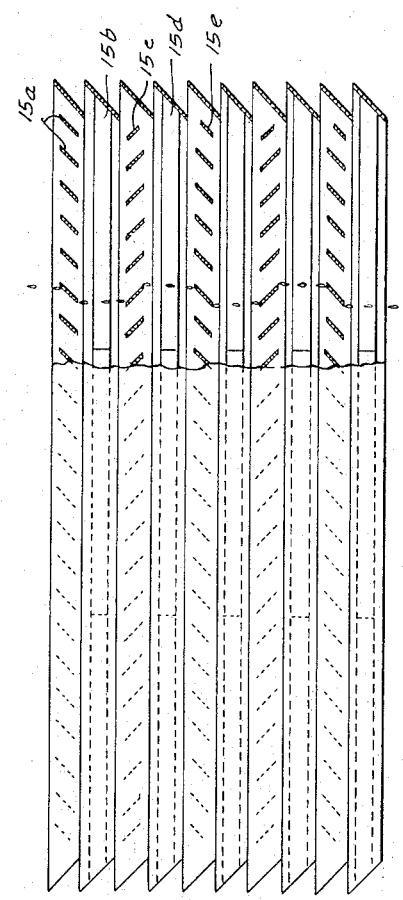
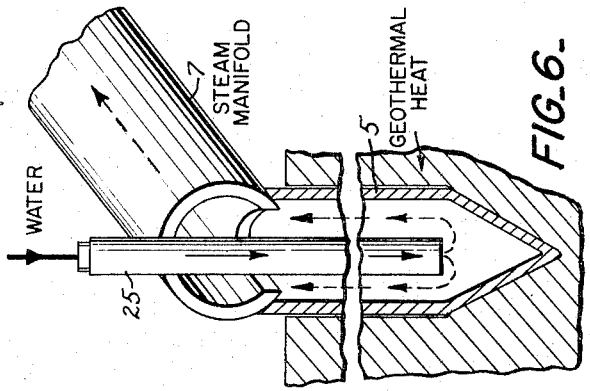
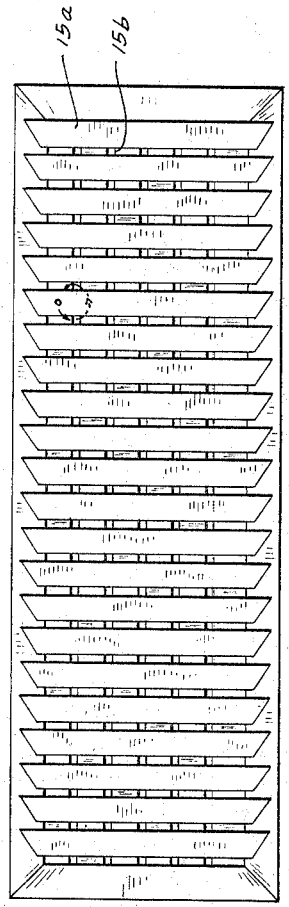
INVENTOR
Juan T. Villanueva
BY
Michael J. Striker
ATTORNEY

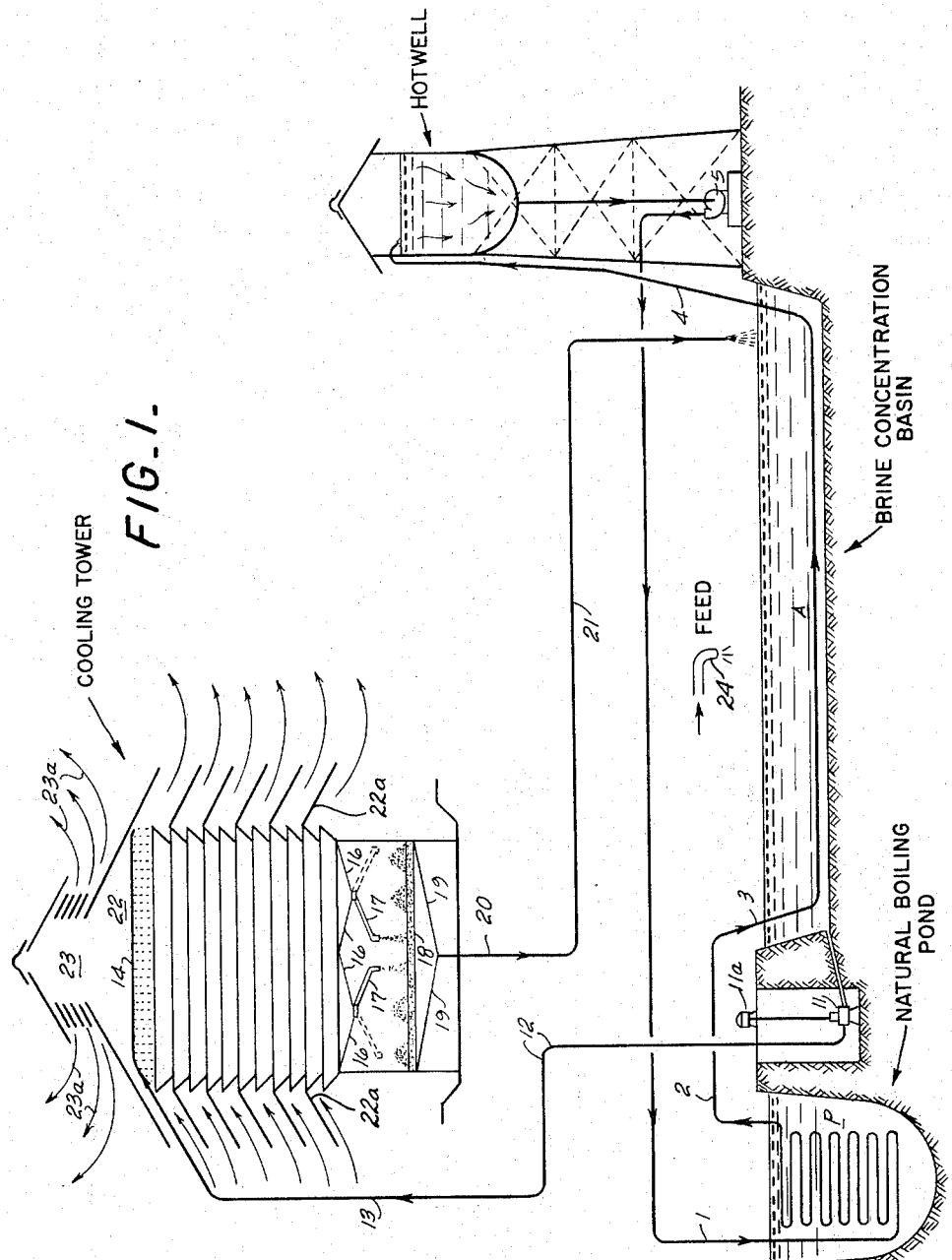

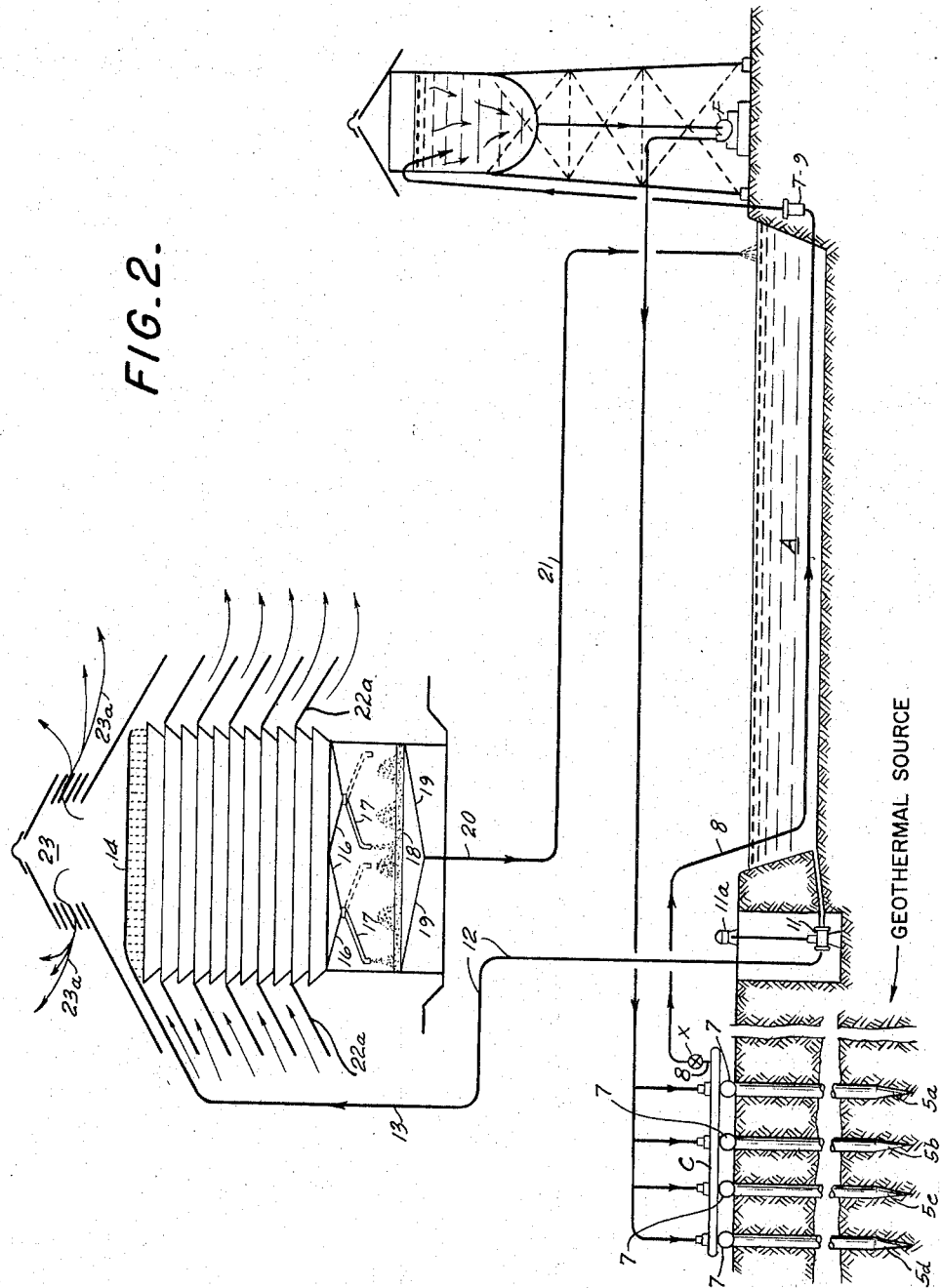

United States Patent Office 3,363,664
Patented Jan. 16, 1968

3,363,664
SCHEME OF SALT MANUFACTURE
Juan T. Villanueva, 105 Apo St., Sta. Mesa Heights,
Quezon City, Republic of the Philippines
Filed Nov. 4, 1964, Ser. No. 408,993
Claims priority, application Republic of the Philippines,
Feb. 25, 1964, 5,436
8 Claims. (Cl. 159—4)

In some areas of the world, salt is available in form of natural deposits which can be easily mined. Most of the salt consumed in the world is, however, recovered through selective evaporation of sea water, either by utilizing the radiant heat energy of the sun or by artificial means through the application of heat by combustion of fuels. The most economical of the systems used in this connection is the utilization of heat radiated by the sun during dry seasons to evaporate sea water placed within evaporating basins, taking advantage of the tides of the sea in order to preclude expensive pumping operations. However, this process is absolutely dependent upon natural phenomena and climate. It is evident that in cases of snow or rain or at night when the sun is absent, salt recovery is impossible in this manner.

Many attempts have therefore been made to recover salt from sea water, particularly using natural heat derived not necessarily from the benefits of sunlight but from other natural sources such as from hot springs or fumaroles or sulfataras—i.e. volcanic manifestations of heat coming from the core of the earth. However, no economically feasible system based on this principle is known to me.

It is the purpose of the present invention to propose a system for the economical manufacture of common salt (natrium chloride) from sea water, or of any other salt or product naturally available in solution, by taking advantage of the heat energy of fumaroles. To attain my objective I make use of the evaporating possibilities of evaporative condensers, cooling towers, spray ponds and similar mechanical devices solely for cooling water used for dissipating the heat from internal combustion engines, surface condensers of steam power plants and refrigerant liquefying condensers of air conditoning and refrigerating plants. The invention also contemplates the use of barometric condensers, as an alternative possibility for the precipitation of salts and/or similar solids in solution and proposes to overcome the complications in the design of such condensers arising from variations of partial vacuum conditions within the devices.

The invention is illustrated in the appended drawings, wherein:

FIG. 1 is a side elevation, partly in cross-section, of a plant in accordance with the invention;

FIG. 2 is a view similar to FIG. 1, but of an alternative embodiment;

FIG. 3 is a side elevation of a cooling tower or evaporative condenser, showing the arrangement of baffles within evaporation trays;

FIG. 4 is an end elevation of the embodiment in FIG. 3;

FIG. 5 is a top plan view of the embodiment in FIGS. 3 and 4; and

FIG. 6 is a somewhat schematic partly sectioned detail view illustrating the recovery of geothermal heat in the arrangement of FIG. 2.

It should be understood that the illustrations shown in simplified form so that they could serve as guide in the design and construction of the actual plant.

The process is based upon two basic principles, namely—(a) "Heat Transfer" whereby heat is drawn from a natural source, such as a hot spring or the natural hot substrata of locations where geothermal heat is manifested, and is subsequently transferred by means of heat exchanging devices to the sea water or brine stored in basins, which latter are hereafter referred to as brine concentration basins; and (b) brine concentration and salt precipitation whereby the hot sea water or brine deposited in the brine concentration basins is kept in circulation through cooling towers or evaporative condensers in order to drive therefrom water vapor emitted as a result of the high vapor tension of the liquid caused by the high temperature to which it has been raised. The continuous evaporation in the cooling towers of evaporative condensers would eventually cause precipitation of the salts in solution after the critical evaporation point occurs so that, if a suitable filter or strainer is placed to collect the salt crystals thus formed before returning the remaining mother liquor to the brine concentration basins for further heating and subsequent recirculation through the cooling tower or evaporative condenser for repetition of the process, an automatic means for the continuous extraction of salt is thus obtained which is practically independent from meteorological conditions, provided that it is duly sheltered from rain and/or snow.

Depending upon the natural heat source available, two possibilities exist for the recovery of geothermal heat.

Referring to FIGURE 1 of the drawings, if the fumarole is a natural boiling pond $p$, pipe or tube coils 1, 2 are suspended therein and a liquid which will not evaporate is circulated within the coils the most economical such liquid being water of course. Similar coils 3, 4 of the same pipe are also suspended in the brine concentration basin A which is initially filled up with sea water eventually concentrated to brine because of continuous evaporation.

Closed circulation of water by pump 5, through the coils 1, 2 immersed within the boiling pond $p$ and 3, 4 submerged in the brine or sea water which is supplied by a feed 24 to the brine concentration basins A, tends to transfer the heat from the boiling pond $p$ to the basin A, thereby raising the temperature of the sea water or brine and making possible the effective evaporation of the latter if subjected to the action of condensers.

With a boiling pond or water as source of heat the brine temperature would be theoretically limited to the temperature of the source i.e. that of boiling water under atmospheric conditions at sea level, namely 212° F.

For practical purposes of salt production it is estimated that a temperature not less than 140° F. entering the cooling towers or evaporating condensers would be economically effective enough although higher temperatures, which ideally cannot go beyond 210° F. and which most likely and practically would be around 180° F., would in reality of course be highly desirable.

On the other hand it might be desired to extract steam from the site of the fumaroles or natural heat manifestations from the core of the earth as applicant has done, obtaining a pressure as high as 25 p.s.i.g. Of course, this requires driving of wells and sinking therein pipes, within which the steam is to be generated to thus offer a source of live steam even of low pressure for heating the sea water or brine contained within the concentration basins.

FIGURE 2 shows an installation for this purpose. Multiple pipes, all closed at their ends and designated with reference numerals 5a, 5b, 5c and 5d, are driven with their closed bottom ends into the ground in the area showing manifestations of abundant natural heat. Preferably, the bottom ends are pointed for easy penetration. Each of the pipes 5a–5d has a second pipe coaxially arranged therewithin through which water is fed under pressure by a boiler feed pump F installed at ground level below the elevated tank H.

FIG. 6 is a detail view showing one of the pipes, namely the pipe 5, driven into the ground. The second or inner pipe, here designated with reference numeral 25, is coaxial with pipe 5 and water is fed through pipe 25 in the direction of the solid-line arrows. From pipe 25 the water passes into pipe 5, where it is heated and converted into steam which rises in the direction of the broken-line arrows to subsequently flow into the steam manifold 7.

The pipes 5a–5d are all connected at their upper ends to a horizontal steam manifolds 7 which in turn communicate with a collector pipe C from where steam enters into the steam main 8 through a throttling valve X.

Steam main 8 is connected via individual throttles or control valves to the heat exchanger coils 8, 9 etc. which are immersed in the brine concentration basins A all appearing in FIGURE 1.

The coils 8, 9 etc. empty condensate from the steam into individual steam traps 9 the outlets of which are interconnected for the collection of the entire recoverable condensate for delivery into a hot well for economical recovery both of the soft water and of the residual heat content thereof.

The advantage of this system lies in the assurance of high temperature of the brine say: 200° F. or even 210° F., that is to say approaching if not actually reaching the ideal boiling temperature of water under atmospheric conditions at sea level.

The decision whether to utilize this more complicated and expensive construction rather than the simpler arrangement shown in FIG. 1 will be dictated largely by considerations relating to the economy of recovery.

Irrespective of the process used, it will be understood that the increase of temperature of sea water or brine to a level much higher than atmospheric conditions brings about the increase of vapor tension in the liquid as compared to the partial vapor pressure exerted by the moisture in the atmosphere. An unbalance relative to the ambient atmosphere is realized by the heating with a resulting tendency to re-establish equilibrium with the atmosphere through the emission of excess water vapor in the hot sea water or brine, thereby bringing down its temperature until it theoretically reaches the dew point under the prevalent conditions.

Taking advantage of this phenomenon, sea water and/or brine brought to a constant temperature considerably higher than the dew point of the atmosphere is reduced to droplets or even fine sprays which are exposed into contact with atmospheric air either through natural means in cooling towers and spray ponds or through artificial means in evaporative condensers, thereby enhancing the emission of excess vapor in the droplets until the temperatures thereof theoretically are brought down to the saturation temperature of the moisture existing in the atmosphere.

Although artificially operated evaporative condensers can be used in this recovery process as pointed out before, cooling towers are preferred for economic reasons. Such cooling towers, which make use of the evaporative possibilities of naturally moving air, are well known and need not be specifically described. The purpose is, of course, to circulate air through the falling drops of hot brine in order to carry away therefrom the necessary evaporation for concentration of the brine mother liquor and eventually bring about the main objective of the process—which is precipitation of disolved salts as soon as the point of saturation of the solution has been reached.

Of course, the hot mother liquor must be protected against adverse ambient influences, for instance, dilution by rain or snow. Therefore, the invention proposes certain improvements in cooling towers, evaporative condensers and spray ponds which are directed towards the protection of the hot mother liquor against the diluting effects of rain or snow, namely.

First, housing the cooling tower or evaporative condenser or spray pond within a suitable shelter against rain or snow;

Second, surrounding this shelter with walls consisting entirely of inclined roofs or leantos or single pitch roofs arranged vertically in series one over the other in louver fashion and preferably with variable pitch in the manner of slats in Venetian blinds—with a view to protecting the structures against the diluting effects of rain or snow in such manner that while raindrops and/or snowflakes are completely excluded therefrom to prevent their mingling with descending drops of mother liquor, atmospheric air has free access and can freely carry away the excess water vapor emitted by the descending cooling drops.

Third, innovation upon the design of the cooling tower or evaporative condenser consisting in slanting of the slats which in conventional cooling towers and evaporative condensers are usually arranged horizontally flat with a view to checking the fall of and procure a decelerating effect upon the descending droplets being cooled. The reason for slanting the slats in accordance with the present invention is to prevent retention upon them of solids precipitated out of solution which constitutes the main objective of this invention—namely, the production of salts.

Finally, the fourth innovation proposed is the introduction of a filter screen or bed in order to arrest the salt crystals formed, while allowing the mother liquor to pass through for further processing. Such a filtering element is preferably, but not necessarily made of layers of fabric constructed with bast fiber yarn such as ramie or jute or of coconut coir fiber yarn as warp and/or tar impregnated rattan or bamboo match sticks as weft; the reason for the selection of the materials specified being simply their resistance to decay. For effective and yet economical filtering it is herein proposed that alternate layers of the fabric be angularly offset through ninety degrees or to be more explicit, if the warp of the first layer is laid, say, in a north-to-south direction, the warp of the second layer would be laid in an east-west direction. The third layer would be laid in the same manner as the first layer while the fourth layer will be placed as the second one, etc. All these layers will be pressed together by and between wooden lattice frames, each made of one to one-and-one-half inch square creosote-impregnated wood strips, the entire filtering assembly being laid upon suitable supporting joists from which the mother liquor falls onto slanting wooden floors properly caulked along the joints and arranged in funnel-like manner, in order to collect said mother liquor for return to the brine concentration basin.

Referring again to FIGURES 1 and 2, each brine concentration and salt precipitation unit consists of the brine concentration basin A where the brine is heated up and forced upwards positively by a vertical sump pump 11, which is driven by an electric motor 11a, into the main and secondary troughs 14 through the interconnecting pipe 12 and riser pipe 13. Troughs are located at the uppermost top of the cooling tower or evaporative condenser and are in their construction generally similar to the troughs over filter beds of rapid sand filters of water purification plants. The hot brine drops will be released from notches distributed all along the walls of the secondary troughs, starting therefrom their downward fall onto the slanting slats 15a, 15b, 15c, 15d, 15e etc. shown in FIGURES 3, 4 and 5, while meeting the prevailing wind penetrating the cooling tower or the air blast introduced into the evaporative condenser either one of which will carry away the excess vapor in the liquor, simultaneously cooling the latter before return to the brine concentration basin A, after being collected by funnel-shaped floor 16 of the cooling tower or evaporative condenser and guided by trunk ducts 17 which can be freely moved in any direction to empty onto desirable locations over a filter screen 18.

Protected by the wooden lattice work over the filter screen fabric described, the salt thus deposited can be simply scraped into a side opening which opens into a bucket which can either feed onto a conveyor or to a dump car or similar form of conveyance for delivery to a centralized room for final removal of excess water by means of hydro-extractors, to be followed by weighing, batching and packing in bags for the market. All of this can be accomplished by automated equipment.

The mother liquor freed from the precipitate which is the desired product, i.e. salt, continues on its way downwards for collection under the filter beds by another arrangement of collecting funnels 19 and is thereafter conducted by connecting pipes 20 to main a return duct 21 which returns the liquor to the brine concentration basin A for reheating and subsequent repetition of the processes.

The protective housing provided for the cooling tower or the spray pond is intended to shelter the entire respective mechanical structure. The design shown in FIGURES 1 and 2 consists of an ordinary warehouse structure 22 with a monitor roofing arrangement 23 on top. The monitor roof appendage is provided with louvers along its sides 23a for the expeditious and effective disposal of the vapors formed. The sides of the main building 22 are also provided with lean-tos or inclined single pitch roofs 22a, arranged in such a manner as to provide the same or even a better protection against rain and snow than is obtainable with the much smaller conventional louvers.

What is novel and for which claims are made is mainly the grouping and/or combination of otherwise well known equipment, apparatus or machinery as mentioned above, as well as the innovations, alterations, improvements, changes or modifications upon the latter or upon the functions and/or principles of their operations have been herein proposed in order to make them capable of performing the tasks assigned to them for the purposes of utilizing geothermal heat energy available in fumaroles—more specifically known as Sulfataras, for the continuous, simple and economical extraction of salts in particular, and of any other substance similarly in solution in general, from the respective solvent carrier. It will be understood that the present invention is applicable regardless of whether the substance containing solutions are from the sea, from lakes, from highly mineralized springs or are simply by-products of industry.

I therefore claim as invention and discovery and originality the following:

1. A method of extracting a solid ingredient from a solution containing a liquid solvent and having the solid ingredient dissolved therein, comprising the steps of continuously circulating a heating fluid initially through a geothermal heating station for raising the temperature of said fluid, and subsequently in heat-exchanging relationship through a body of the solution for raising the temperature of such solution to a predetermined level; removing heated solution from the body of solution and continuously passing it through an evaporative cooling zone; contacting the heated solution in such zone with a gas stream whose vapor pressure is less than that of the heated solution at its predetermined temperature level to enhance the evaporative cooling effect and concentrate the solution to thereby cause precipitation of at least some of the solid ingredient and separation thereof from the remainder of the thus cooled solution; continuously returning the remainder of said cooled solution to the body of solution; and recovering the precipitated solid ingredient.

2. A method as defined in claim 1, wherein the temperature of the solution is raised to at least 140° Fahrenheit.

3. A method as defined in claim 1, wherein the heating fluid is water which, during passage through the geothermal heating station, changes into steam; and further comprising the step of continuously recovering condensate from the steam and recirculating such condensate to the geothermal heating station.

4. A system for extracting a solid ingredient from a solution containing a liquid solvent and having the solid ingredient dissolved therein, comprising reservoir means containing a body of the solution; conduit means having a first portion located in said reservoir means immersed in the body of solution, and a second portion spaced from and communicating with said first portion and extending into a geothermal source of heat; circulating means for continuously circulating a heating fluid initially through said second portion of said conduit means for heating by the geothermal source and subsequently through said first portion for heat-exchange with the solution in said reservoir means, whereby such solution is heated to a predetermined temperature; pump means for continuously removing heated solution from the body of solution and for advancing such heated solution in a predetermined path toward a downstream end of such path; evaporative cooling means adjacent a portion of said path and arranged to promote contact of the heated solution with a gas stream whose vapor pressure is less than that of the heated solution at said predetermined temperature thereof to enhance the evaporative cooling effect and concentrate the solution to thereby cause precipitation whereby at least some of the solid ingredient is precipitated out of the remainder of the thus cooled solution; and means for continuously returning said remainder into said reservoir means.

5. A system as defined in claim 4, and further comprising filtering means for filtering the solution in said cooling means so as to separate the precipitated solid ingredient from said remainder of the cooled solution.

6. A system for extracting a solid ingredient from a solution containing a liquid solvent having the solid ingredient dissolved therein, comprising reservoir means containing a body of the solution; conduit means having a first portion located in said reservoir means immersed in the body of solution, and a second portion spaced from and communicating with said first portion and extending into a geothermal source of heat; circulating means for continuously circulating a heating fluid initially through said second portion of said conduit means for heating by the geothermal source and subsequently through said first portion for heat-exchange with the solution in said reservoir means, whereby such solution is heated; evaporative cooling means adjacent said reservoir means and defining an evaporative cooling zone, said evaporative cooling means comprising an evaporative cooling tower having a peripheral wall provided with a plurality of overlapping wall portions tiltable about parallel axes so that adjacent ones of said wall portions define between themselves adjustable slots of a cross-section which is substantially constant in various positions of adjustment of said wall portions.

7. A system as defined in claim 6, wherein said wall portions are constructed and tiltably arranged in such a manner as to be adjustable for precluding the entry of rain and snow into the interior of said evaporative cooling tower while permitting free circulation of air therethrough in any position of adjustment.

8. A system as defined in claim 6; and further comprising filtering means for filtering the solution in said evaporative cooling means so as to separate the precipitated solid ingredient from the remaining solution.

References Cited

UNITED STATES PATENTS

| | | | |
|---|---|---|---|
| 213,971 | 4/1879 | Brownell | 159—37 |
| 253,124 | 1/1882 | Stevens | 159—37 |
| 1,892,760 | 1/1933 | Burnham | 159—45 X |
| 1,917,154 | 7/1933 | Porter | 165—45 X |
| 2,438,720 | 3/1948 | Smith | 165—45 X |
| 2,461,449 | 2/1949 | Smith et al. | 165—45 X |
| 2,859,766 | 11/1958 | Shuldener | 137—268 |
| 3,140,986 | 7/1964 | Hubbard | 60—26 X |
| 3,274,769 | 9/1966 | Reynolds | 165—45 |

FOREIGN PATENTS 906,532  9/1962  Great Britain.

NORMAN YUDKOFF, *Primary Examiner.*

WILBUR L. BASCOMB, JR., *Examiner.*

J. SOFER, *Assistant Examiner.*